Patented Feb. 10, 1948

2,435,594

UNITED STATES PATENT OFFICE 2,435,594

HYDRAULIC CEMENT COMPOSITION

Donald R. MacPherson, University Heights, Ohio, assignor to The Master Builders Company, Cleveland, Ohio, a corporation of Ohio No Drawing. Application October 20, 1945, Serial No. 623,603

8 Claims. (Cl. 106—90)

This invention relates to hydraulic cement compositions such as concrete or mortar and to indurating compositions for addition to concrete or mortar mixes. It especially relates to such compositions and mixes containing a plasticizing agent which permits substantial improvement in the strength of structures prepared from such compositions.

The use of agents such for example as waste sulfite liquor to reduce the water-cement ratio of an hydraulic cement mortar or concrete has permitted substantial improvement in the properties of structures formed thereof. However, there have been some disadvantages connected with the use of the agents heretofore proposed which have in some measure limited the commercial acceptance of the cement compositions containing them. Thus, when small amounts of raw waste sulfite liquor or the dry residue thereof is added to cement mixes, as disclosed in United States Patents 2,169,980 and 2,229,311 of Edward W. Scripture, the water-cement ratio may be reduced a very substantial amount and the strength of the concrete at later ages is substantially increased. The use of these plasticizing agents with some cements may be disadvantageous in that the strength at early ages, such as one to seven days, may be less than that of the plain mortar or concrete mix, and in that the amount for optimum results in some instances may be critical, even though an accelerator be present.

It is an object of the present invention to provide a cement composition or an indurating composition for cement mixes comprising ingredients of low cost which markedly plasticize concrete or mortar mixes, which improve the strength of the concrete at later ages and which are not deleterious to cement mixes if inadvertently added in relatively larger amounts than usually recommended.

It is another object of the present invention to provide improved strength at early and late ages of a concrete or mortar mix of a given consistency made with a lower water-cement ratio than that of a plain mortar or concrete mix having the same proportions of cement and aggregate.

It is another object of the present invention to provide a methode of preparing concrete having improved compressive strength at early as well as at late ages.

A further object of the present invention is to provide an indurating composition for addition to cement or concrete mixes which accelerates the ratio of hardening of the cement as well as permitting a reduction in the water-cement ratio, giving increased compressive strength.

A still further object of the present invention is to provide a dry cement which when mixed with aggregate and sand permits a reduction in the normal amount of water at a given consistency and gives a higher strength to products made therewith.

I have found that the above and other objects, which will be apparent from the following description of the invention, are accomplished by incorporating in the cement "residuum solids of fermented sulfite liquor." This term designates solids from the residue of waste sulfite liquor such as has been fermented and from which the fermented product, such as an alcohol, has been removed.

I have found that residuum solids of fermented sulfite liquor produce resultant cement mixes that are greatly superior to those produced with raw waste sulfite liquor or lignin constituents separated from waste sulfite liquor.

The datta herein reported indicate that the fermentation of waste sulfite liquor or the distillation of the fermented liquor to remove the alcohol therefrom modifies the character of the active constituents normally in the liquor so that the residuum solids so obtained give substantially improved properties to cement mortar or concrete mixes.

As little as .01% based on the weight of the cement, of the residuum solids of fermented sulfite liquor is noticeably effective in improving the properties of cement or concrete mixes and products produced therefrom. An amount of these residuum solids much greater than .5% or .6% by weight of the cement is not usually commercially economical, and for most purposes smaller amounts of residuum solids of fermented sulfite liquor produce optimum results. The amount of residuum solids of fermented sulfite liquor preferably present is about .1% or .2% to about .35% or .4% by weight of the cement.

A desirable indurating composition for cement mixes comprises residuum solids of fermented sulfite liquor, a finely divided carrying or filling material such as a pozzolana, gypsum, hydrated lime or limestone and/or an accelerator such as calcium, to accelerate the rate of hardening and setting. These ingredients may be proportioned to provide .05% to .6% of the residuum solids of fermented sulfite liquor and if an accelerator is desired, the ingredients are proportioned to provide .1% to 2% or 2.5% of the accelerator.

These percentages are based on the weight of the cement. The additional ingredients, such as fly ash and other finely divided materials, are preferably present in admixture with the aforementioned residuum solids in the indurating composition.

Dry, wet or dissolved residuum solids of fermented sulfite liquor are found to give exceptional results when used in cement, mortar or concrete mixes together with a derivative of benzoic acid, such as set forth in one or more of the United States Scripture Patents Nos. 2,264,336, 2,360,517, 2,360,518 and 2,360,519. The preferred derivative of benzoic acid is salicylic acid or a salt thereof.

An especially desirable indurating composition for cement mixes comprises the residuum solids of fermented sulfite liquor and a substituted benzoic acid, or a salt or ester thereof, such as salicylic acid, or a compound containing the salicylic group, with or without an accelerator such as calcium chloride and with or without a finely divided filling material such as a pozzolana. The ingredients in this indurating composition should be so proportioned that when the composition is mixed with cement there will be present about .05% to about .06% of the residuum solids of fermented sulfite liquor and at the same time .01% to 5% of substituted benzoic acid, salt or ester thereof. The pozzolanic material may be present in any suitable proportion in an indurating composition, but the accelerator, such as calcium chloride, if used should be present in the amount of .1% to about 2.5% by weight of the cement when the indurating compostion is incorporated in the cement, concrete or mortar mix to improve the properties thereof.

Applicant's product can best be defined by the process of manufacture, as the ordinary commercial chemical analysis does not adequately characterize the active ingredients or distinguish these materials over those present in the products produced by other methods. The improved character of the product of the present invention is primarily noted in the character of the cement compositions in which it is present.

The improvement in properties of concrete containing residuum solids of fermented sulfite liquor (which may if desired be retained in a liquid medium) over properties obtained through the use of equal amounts of other agents heretofore proposed may be seen from the following examples in which parts are by weight.

Example 1

Three separate mixtures were prepared, each mixture comprising 500 parts of Portland cement, 1500 parts sand and 1000 parts of pea gravel. Mix No. 1 served as the control; it did not contain any indurating composition. To mix No. 2 was added 1 pound of an indurating composition consisting of .21 of a pound of the dried residue of waste sulfite liquor, .69 of a pound of calcium chloride, and .1 of a pound of fly ash per 94 pound bag of cement. To mix No. 3 was added the identical amount of indurating composition, but differing from that of mix No. 2 in that the dried waste sulfite liquor was substituted by the same amount of residuum solids of fermented sulfite liquor. Each of the mixes was prepared with sufficient water to provide approximately the same plasticity, as measured by the slump using a six-inch cone. The concrete of each mix was cast into 2" x 2" cubes. The compressive strength of three cubes from each batch was measured after one day, and the compressive strength of three additional cubes from each batch was measured at the end of twenty-eight days. The pertinent data, including water-cement ratio (W/C) in terms of gallons of water per sack of cement, cement factor (C. F.) of concrete in sacks of cement per cubic yard of concrete, plasticity as measured by the slump and the unit weight of the concrete in pounds per cubic foot, are shown in the following table:

| Mix | W/C (G. P. S.) | C. F. (S. C. Y.) | Slump (In.) | Unit Weight (P. C. F.) | Compressive Strength (Lbs./sq. in.) | |
|---|---|---|---|---|---|---|
| | | | | | 1 Day | 28 Days |
| 1 | 7.33 | 6.27 | 1¼ | 145.0 | 400 | 4,525 |
| 2 | 6.20 | 6.33 | 1½ | 144.2 | 100 | 5,450 |
| 3 | 6.20 | 6.35 | 1¼ | 145.0 | 1,000 | 6,000 |

Example 2

Three separate concrete mixes were prepared, each mix comprising 22 pounds of Portland cement, 56 pounds sand, and 82 pounds of ¾ inch stone. The first mix served as the control. To the second mix was incorporated .4% based on the weight of the cement, of the dried residue of waste sulfite liquor. To the third mix was added 4%, based on the weight of the cement, of residuum solids of fermented sulfite liquor. Sufficient water was added in each case to provide a slump of three inches as measured by a 12 inch cone. Six inch by twelve inch cylinders were used to measure the compressive strength of the concrete at 1, 3, 7 and 28 days. The results are shown in the following table, each value given for compressive strength representing the average value for several cylinders.

| Mix | W/C (G. P. S.) | C. F. (S. C. Y.) | Slump (In.) | Unit Weight (P. C. F.) | Compressive Strength (Lbs./sq. in.) | | | |
|---|---|---|---|---|---|---|---|---|
| | | | | | 1 day | 3 days | 7 days | 28 days |
| 1 | 7.33 | 5.39 | 3 | 148.5 | 885 | 2,400 | 3,290 | 4,600 |
| 2 | 5.98 | 5.42 | 3 | 146.4 | 60 | 1,340 | 2,970 | 4,600 |
| 3 | 5.96 | 5.36 | 3 | 145.2 | 475 | 2,570 | 3,710 | 5,200 |

Example 3

Four separate mixes were prepared, using the same proportion of cement and aggregate. Each mix, with the exception of the first, which served as the control, contained 500 grams of an hydraulic cement, such as Portland cement, 1375 grams of sand, 1125 grams of pea gravel, and .32% by weight of the cement of a plasticizing agent. The percentage of plasticizing agent was based on the amount of solids which would remain as the material was vacuum dried at 80° C. until no further loss in weight occurred. In the preparation of each of the mixes, the water-cement ratio was selected to provide about the same slump, i. e., about two inches using a six-inch cone. The following table shows the relative compressive strength of 2" x 2" cubes at the ages of seven days and twenty-eight days—each of the values is the average from six tests.

| Mix | Relative Compressive Strength (plain mix taken as 100) ||
|---|---|---|
| | 7 days | 28 days |
| 1 | 100 | 100 |
| 2 | 89 | 88 |
| 3 | 102 | 103 |
| 4 | 127 | 120 |

Mix No. 1 in the above table is the plain mix. In mix No. 2 the addition was a concentrated product (syrupy liquid) obtained by dialyzing neutralized and concentrated waste sulfite liquor. In mix No. 3 the addition was a purified lignin complex compound obtained in the form of a dry powder produced by the Howard process, i. e., by precipitating the lignin complex compound with lime. In mix No. 4, the plasticizing agent was a residuum solid of fermented sulfite liquor.

It will be seen from the above that residuum solids of fermented sulfite liquor provided far greater compressive strength at ages of seven days or more in concrete than was obtained by the use of the other plasticizing agents, all derived from waste sulfite liquor by processes wherein the lignin complex compound was separated from the balance of the waste liquor.

It will be seen from the above examples that cement compositions containing residuum solids of fermented sulfite liquor are superior in strength, both at early and late ages, to the above cement compositions which do not contain any additions. Referring to Example 1, the cement compositions containing waste sulfite liquor at one day had materially less strength than the concrete which did not contain any addition. The concrete containing residuum solids of fermented sulfite liquor had a strength two and one-half times greater than that without addition. While the strength of the concrete containing waste sulfite liquor at twenty-eight days was substantially greater than that of the concrete which did not contain any addition, the strength of the concrete containing residuum solids of fermented sulfite liquor showed a further large improvement.

From the table of Example 3, it is apparent that the mere purification of the active constituents of waste sulfite liquor does not explain the marked improvement which I have obtained with the residuum solids of fermented sulfite liquor. Thus, comparing mixes No. 2 and No. 4, it is clear that strengths of concrete prepared in accordance with the present invention were far superior, both at early and later ages, to those obtained from concrete prepared by utilizing lignin sulfonates extracted from waste sulfite liquor by a dialysis process. Similarly, comparing mixes No. 3 and No. 4, it is clear that while the active lignin compound used in mix No. 3, which is a lignin compound separated in relatively pure form by a precipitation process, gave improved strength to concrete, it does not give anywhere near the strength obtained with the residuum solids of fermented sulfite liquor.

The Portland cement utilized in the above examples may be substituted by other hydraulic cements, such as aluminous cement. The quantities of the ingredients may be varied or the aggregate may be omitted entirely in accordance with the usual practice as recognized by those skilled in the art.

Furthermore, it is to be understood that the particular form of product shown and described and the particular procedure set forth are presented for purposes of explanation and illustration, and that modifications of said product and procedure can be made without departing from my invention as defined in the appended claims.

What I claim is:

1. A dry cement composition comprising an hydraulic cement and .01% to .6%, based on the weight of the cement, of residuum solids of fermented sulfite liquor, said residuum solids being substantially devoid of fermentable sugars present in the unfermented waste sulfite liquor.

2. A dry cement composition comprising an hydraulic cement, .01% to .6%, based on the weight of the cement, of residuum solids of fermented sulfite liquor, and .1% to 2.5% of calcium chloride and a pozzolanic material, said residuum solids being substantially devoid of fermentable sugars present in the unfermented waste sulfite liquor.

3. A concrete or mortar mix comprising an hydraulic cement and .01% to .6%, based on the weight of the cement, of residuum solids of fermented sulfite liquor, said residuum solids being substantially devoid of fermentable sugars present in the unfermented waste sulfite liquor.

4. A concrete or mortar mix comprising an hydraulic cement, .01% to .6%, based on the weight of the cement, of residuum solids of fermented sulfite liquor and .1% to 2.5%, based on the weight of the cement, of calcium chloride, said residuum solids being substantially devoid of fermentable sugars present in the unfermented waste sulfite liquor.

5. An indurating composition for hydraulic cement mixes comprising residuum solids of fermented sulfite liquor and calcium chloride, said ingredients being proportioned to give when the indurating composition is incorporated in the cement .01% to .6%, based on the weight of the cement, of residuum solids of fermented sulfite liquor and .1% to 2.5% of calcium chloride, said residuum solids being substantially devoid of fermentable sugars present in the unfermented waste sulfite liquor.

6. An indurating composition for hydraulic cement mixes comprising residuum solids of fermented sulfite liquor, a member of the group consisting of substituted benzoic acids, salts and esters thereof, said ingredients being proportioned to give when the indurating composition is incorporated with the cement .01% to .6%, based on the weight of the cement, of residuum solids of fermented sulfite liquor, and .005% to .5% of said group member, said residuum solids being substantially devoid of fermentable sugars present in the unfermented waste sulfite liquor.

7. The composition of claim 6 which also contains a pozzolanic material.

8. An indurating composition for hydraulic cement mixes comprising residuum solids of fermented waste sulfite liquor and calcium chloride, said residuum solids being substantially devoid of fermentable sugars present in the unfermented waste sulfite liquor.

DONALD R. MacPHERSON.

REFERENCES CITED

The following references are of record in the file of this patent:

UNITED STATES PATENTS

| Number | Name | Date |
|---|---|---|
| 2,081,642 | Scripture | May 27, 1937 |
| 2,360,519 | Scripture | Oct. 17, 1944 |
| 1,042,538 | Ellis | Oct. 29, 1912 |